April 29, 1947.  G. E. KARL  2,419,717
ROTARY HOE
Filed March 29, 1944  3 Sheets-Sheet 1
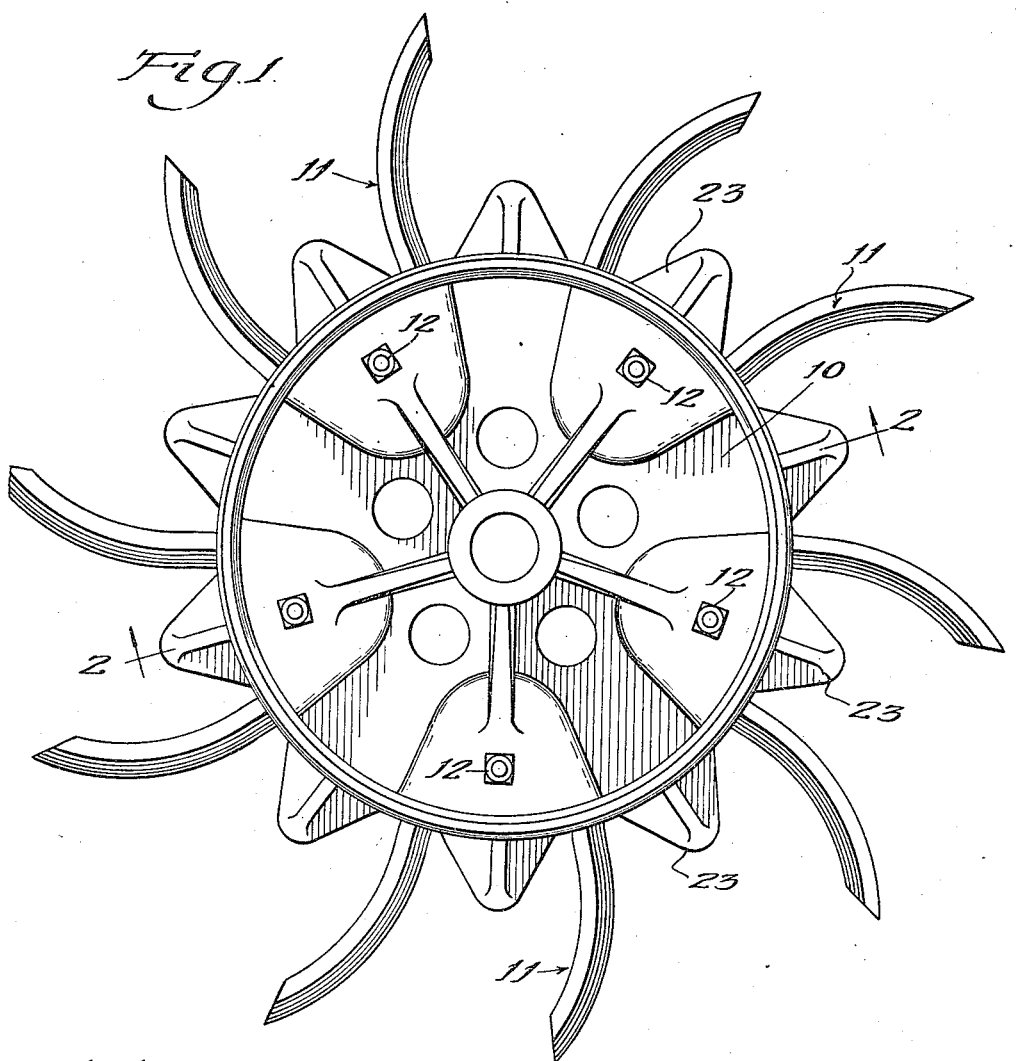
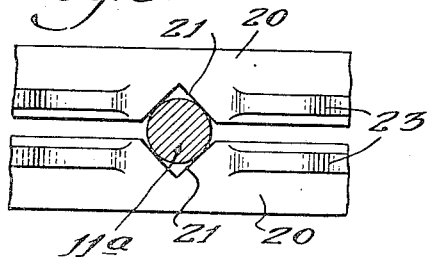
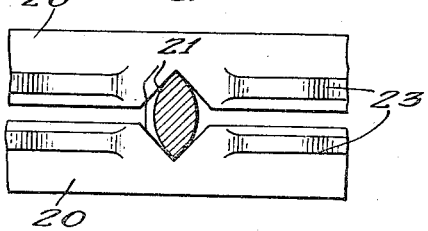
Inventor:
George E. Karl
By Bair & Freeman
Attorneys

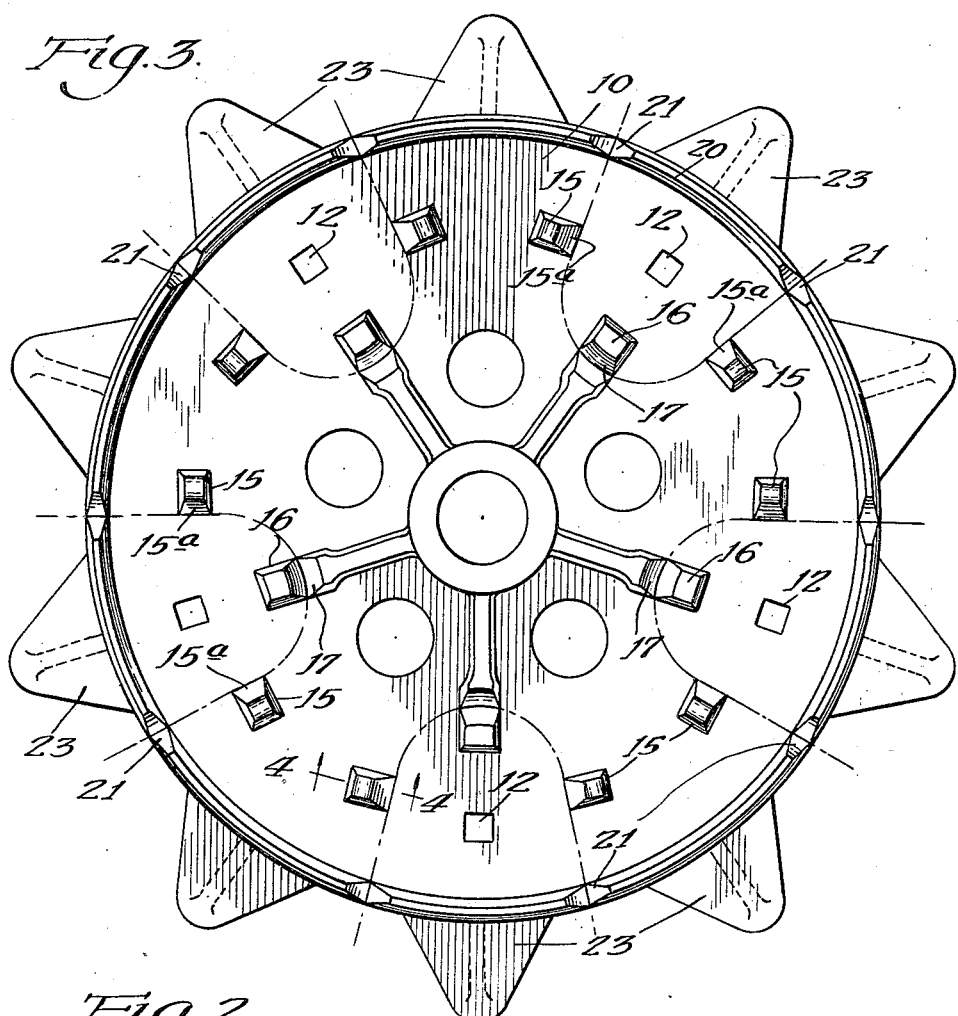
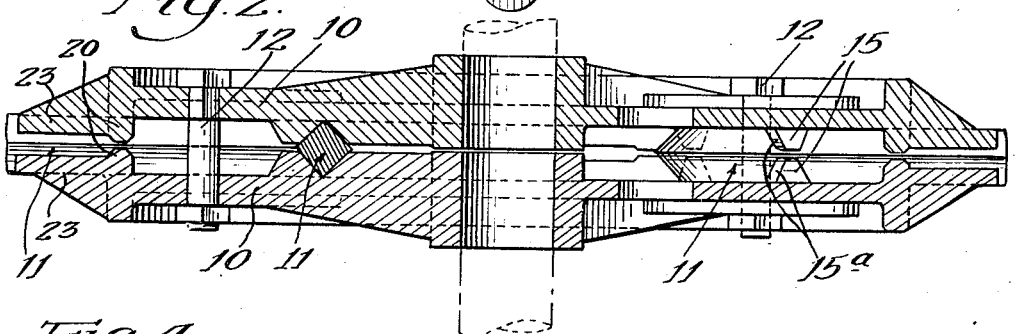
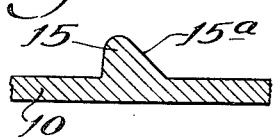

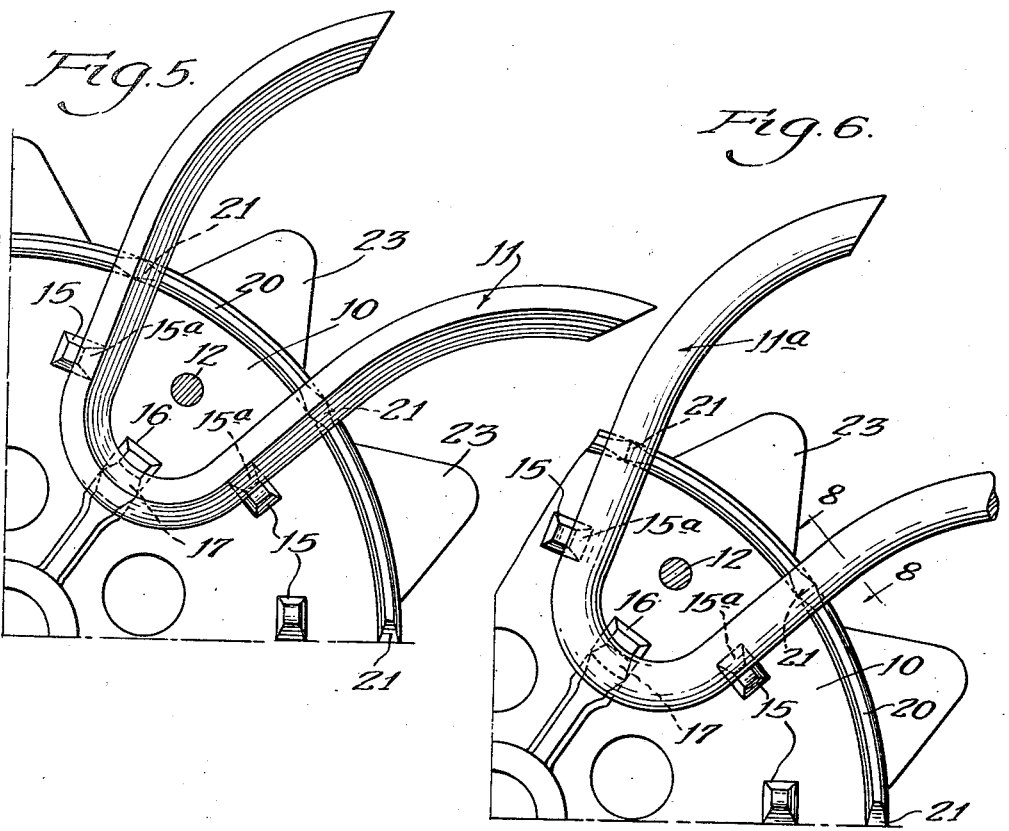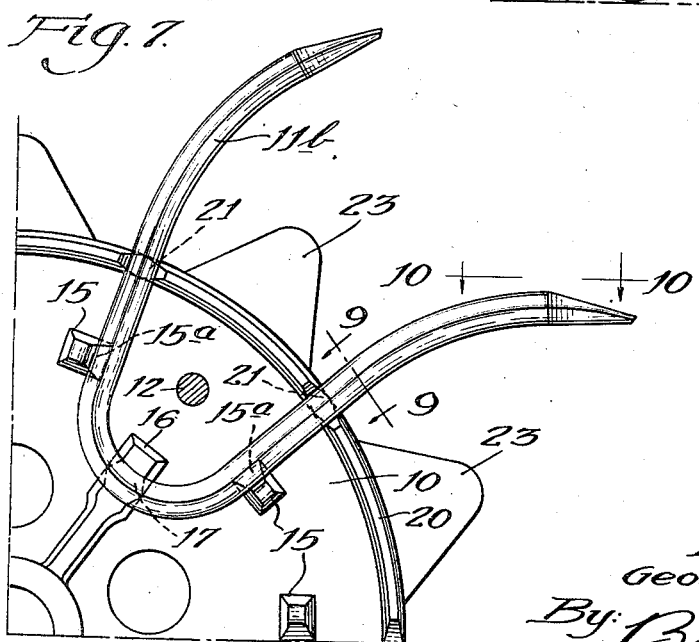

Patented Apr. 29, 1947

2,419,717

UNITED STATES PATENT OFFICE 2,419,717

ROTARY HOE

George E. Karl, Liberty, Ind., assignor to General Implement Corporation, a corporation of Ohio Application March 29, 1944, Serial No. 528,504

7 Claims. (Cl. 97—216)

1

This invention relates to farm implements of the rotary hoe type adapted for use in breaking up, loosening and cultivating the soil. Rotary hoes are usually made up of a plurality of toothed wheels, disposed in a desired spaced apart relation, depending upon the use of the implement or the soil in which the implement is to be operated. More particularly, this invention is directed to improvements in toothed wheels of rotary hoes in which the wheels are provided with removable and replaceable teeth of the double pronged type, and having an anchorage portion of generally U-shaped formation.

One of the objects of this invention is to provide improved toothed wheels of a rotary hoe, having a novel seating and mounting arrangement for the removable teeth, and which permits quick and easy replacement of worn or damaged teeth, and also permits accommodation of teeth having anchorage portions of slightly irregular contour.

Another object is to provide an improved toothed wheel of a rotary hoe having a novel and improved seat and mounting for removable teeth, and which permits accommodation of teeth of various cross sectional contours.

A further object is to provide an improved toothed wheel of a rotary hoe, having means providing a three point mounting seat for the U-shaped anchorage portion of each of the double pronged teeth.

Still another object is to provide an improved toothed wheel of a rotary hoe which effects a substantial saving in metal, which is relatively light in weight, and which is durable in operation and economical to manufacture.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a plan view of the improved wheel of a rotary hoe embodying the present invention.

Figure 2 is a transverse section through the wheel, taken substantially as indicated at line 2—2 on Figure 1.

Figure 3 is an inner face view of one of the plates forming a part of the wheel.

Figure 4 is a fragmentary sectional view through one of the plates and an abutment for a removable tooth, taken substantially as indicated at line 4—4 on Figure 3.

2

Figure 5 is a fragmentary view, with one of the plates omitted, showing the manner of seating of a double pronged tooth formed of rod of diamond shaped cross section.

Figure 6 is a view similar to Figure 5, showing a double pronged tooth formed of rod of circular cross section.

Figure 7 is a view similar to Figure 5 showing a double pronged tooth formed of rod of oval cross section.

Figures 8 and 9 are fragmentary views of the rim of the wheel, having prongs of the teeth of different cross sectional contours, taken substantially as indicated at lines 8—8 and 9—9 on Figures 6 and 7 respectively.

Figure 10 is a fragmentary elevational view of the terminal portion of one of the prongs of the tooth shown in Figure 7.

In rotary hoes of the type embodying the present invention, a plurality of individual toothed wheels are usually mounted loosely in a desired spaced apart relation on a shaft to constitute a unit for certain uses. More than one unit consisting of a plurality of individual wheels may be employed. For certain uses the wheels of one unit are disposed in overlapping or offset relation to the wheels of the other unit. The improved toothed wheel, of a rotary hoe, embodying the present invention, includes two identical cast metal plates 10, of generally circular contour, adapted to be disposed in cooperating relation for embracing therebetween, a plurality of circumferentially spaced apart, outwardly projecting double pronged teeth 11, having generally U-shaped anchorage portions clamped in position between the plates, when the plates are firmly and rigidly connected together by means of a plurality of circumferentially spaced apart bolts 12.

The inner face of each plate is provided with separate sets of means in the form of three abutments constituting mounting seats for each of the double pronged teeth. Each set of three abutments constitutes a three point support for a tooth and includes a pair of abutments as indicated at 15, positioned to engage therebetween, the legs of the anchorage portion of a tooth, as clearly seen in Figures 5, 6 and 7 of the drawings. The third abutment, as indicated at 16, includes a V or U-shaped notch 17, in which the closed end of the anchorage portion is adapted to be seated, as clearly seen in Figure 2 of the drawings. The abutments 15 for each tooth include oppositely tapered surfaces, indicated at 15a, which are adapted to be contacted by the legs of the anchorage portion of the tooth. Thus it will be seen that when the pair of plates 10 are bolted together with the double pronged teeth, seated in cooperating relation to their respective sets of abutments 15 and 16, the corresponding abutments on the respective plates serve to embrace the legs and the closed end of the anchorage portion of the teeth to firmly lock or clamp the teeth in position. By virtue of this arrangement, wherein a three point mounting support is provided for each tooth, the mounting readily accommodates slight irregularities in the formation of the U-shaped anchorage portion of the teeth, thereby permitting quick and easy replacement of damaged or worn teeth, without the necessity of bending and forming of teeth to fit the seats in said plates.

The outer marginal edge of each of the plates is formed with an inturned flange or rim, 20, and the rims of the respective plates are disposed in close spaced relation to each other, as seen in Figure 2 of the drawings. The rims 20, of the respective plates are formed with V-shaped notches or grooves 21, disposed in corresponding registration with each other and in alignment with the contacting surfaces 15a of the abutments 15, and provide, when the two plates are connected together with the teeth in position therebetween, a pair of additional seats or mountings for gripping the legs of each tooth to reinforce the mounting of the teeth between the plates.

The rims 20 of the plates 10 are formed with radially and outwardly extending tapered projections 23, disposed intermediate each adjacent pair of prongs of the teeth. The projections of the two plates are disposed in registration with each other and constitute stone eliminators, and which serve to preclude wedging of stones or other objects between the prongs of the teeth which might result in deformation of the teeth.

In Figures 1, 2 and 5 of the drawings I have shown a double pronged tooth, indicated at 11, formed of a rod of diamond shaped cross section. In Figures 6 and 8 of the drawings, the tooth designated at 11a is formed of a rod of circular cross section, while the tooth represented at 11b in Figures 7, 9 and 10 of the drawings is formed of a rod of oval cross section. It will therefore be apparent that by reason of the novel mounting for the teeth, that the teeth may be formed of a rod of various cross sectional contours and may be readily accommodated by the plates and may be interchanged one for another.

The broadened "fishtail" end of one of the prongs of the tooth 11b shown in Figure 7, insures a wider operating face of the tooth for engaging the soil.

When a tooth becomes worn or damaged it may be quickly and easily replaced by merely removing the bolts 12 which secure the two cooperating plates 10 of the wheel together, and because of the novel mounting for the teeth, the tooth which is substituted for the worn or damaged tooth, may be properly seated and firmly clamped in an operative position, in practically all instances without the necessity of bending and forming of the anchorage portion of a tooth, as heretofore has been necessary in removable tooth types of wheels.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a rotary hoe of the type comprising one or more wheels composed of a pair of cooperating plates and a plurality of circumferentially spaced apart, outwardly projecting double pronged teeth each having a U-shaped anchorage portion clamped firmly between said plates, the improvement comprising three spaced apart abutments, for each tooth, on the inner face of one of said plates to provide a three point seat for the U-shaped anchorage portion of each tooth, two of said abutments for each tooth being positioned to be engaged by the legs of said portion, and the other abutment being positioned to be engaged by the closed end of said portion, said one plate having an inturned marginal flange provided with a pair of circumferentially spaced apart notches for each tooth, said notches being disposed in proper relation to the leg engaging surfaces of said two abutments for each tooth and constituting seats for said legs of said teeth.

2. In a rotary hoe of the type comprising one or more wheels composed of a pair of cooperating plates and a plurality of circumferentially spaced apart, outwardly projecting double pronged teeth each having a U-shaped anchorage portion clamped firmly between said plates, the improvement comprising sets of three spaced apart abutments, for each tooth, on the inner faces of said plates, with the respective sets of abutments disposed in registration to provide a three point seat for the U-shaped portion of each tooth, two of said abutments on each plate, for each tooth, being located so as to be engaged by the legs of said portion of the tooth, and the third abutment of each set, on each plate being located to be engaged by the closed end of said portion of the tooth, one of said plates having an inturned marginal flange provided with a pair of circumferentially spaced apart notches for each tooth, said notches being disposed in proper relation to the leg engaging surfaces of said two abutments of each set and constituting seats for said legs of said teeth.

3. In a rotary hoe of the type comprising one or more wheels composed of a pair of cooperating plates and a plurality of circumferentially spaced apart, outwardly projecting double pronged teeth each having a U-shaped anchorage portion clamped firmly between said plates, the improvement comprising sets of three spaced apart abutments, for each tooth, on the inner faces of said plates, with the respective sets of abutments disposed in registration to provide a three point seat for the U-shaped portion of each tooth, two of said abutments on each plate, for each tooth, being located so as to be engaged by the legs of said portion of the tooth, and the third abutment of each set, on each plate being located to be engaged by the closed end of said portion of the tooth, each plate having cooperating inturned marginal flanges provided with a pair of circumferentially spaced apart notches for each tooth, said notches being disposed in proper relation to the leg engaging surfaces of said two abutments of each set and constituting seats for said legs of said teeth.

4. In a rotary hoe of the type comprising one or more wheels composed of a pair of cooperating plates and a plurality of circumferentially spaced apart, outwardly projecting double pronged teeth each having a U-shaped anchorage portion clamped firmly between said plates, the improvement comprising three spaced apart abutments, for each tooth, on the inner face of one of said plates to provide a three point seat for the U-shaped anchorage portion of each tooth, two of said abutments for each tooth being positioned to be engaged by the legs of said portion, and the other abutment being positioned to be engaged by the closed end of said portion, the tooth contacting portions of said two abutments of each set being tapered in opposite directions.

5. In a rotary hoe of the type comprising one or more wheels composed of a pair of cooperating plates and a plurality of circumferentially spaced apart, outwardly projecting double pronged teeth each having a U-shaped anchorage portion clamped firmly between said plates, the improvement comprising sets of three spaced apart abutments, for each tooth, on the inner faces of said plates, with the respective sets of abutments disposed in registration to provide a three point seat for the U-shaped portion of each tooth, two of said abutments on each plate, for each tooth, being located so as to be engaged by the legs of said portion of the tooth, and the third abutment of each set, on each plate being located to be engaged by the closed end of said portion of the tooth, the tooth contacting portions of said two abutments of each set being tapered in opposite directions.

6. In a rotary hoe of the type comprising one or more wheels composed of a pair of cooperating plates and a plurality of circumferentially spaced apart, outwardly projecting double pronged teeth each having a U-shaped anchorage portion clamped firmly between said plates, the improvement comprising three spaced apart abutments, for each tooth, on the inner face of one of said plates to provide a three point seat for the U-shaped anchorage portion of each tooth, two of said abutments for each tooth being positioned to be engaged by the legs of said portion, and the other abutment being positioned to be engaged by the closed end of said portion, the rim of one plate being formed with radially and outwardly extending, tapered projections, intermediate each adjacent pair of prongs of said teeth.

7. In a rotary hoe of the type comprising one or more wheels composed of a pair of cooperating plates and a plurality of circumferentially spaced apart, outwardly projecting double pronged teeth each having a U-shaped anchorage portion clamped firmly between said plates, the improvement comprising sets of three spaced apart abutments, for each tooth, on the inner faces of said plates, with the respective sets of abutments disposed in registration to provide a three point seat for the U-shaped portion of each tooth, two of said abutments on each plate, for each tooth, being located so as to be engaged by the legs of said portion of the tooth, and the third abutment of each set, on each plate being located to be engaged by the closed end of said portion of the tooth, the rims of said plates being formed with aligned sets of radially and outwardly extending, tapered projections, disposed intermediate each adjacent pair of prongs of said teeth.

GEORGE E. KARL.

REFERENCES CITED

The following references are of record in the file of this patent:

UNITED STATES PATENTS

| Number | Name | Date |
|---|---|---|
| 622,162 | Pattisson | Mar. 28, 1899 |
| 416,982 | Young | Dec. 10, 1889 |
| 2,070,830 | Gravely | Feb. 16, 1937 |
| 823,240 | Waterman | June 12, 1906 |
| 874,268 | Waterman | Dec. 17, 1907 |

FOREIGN PATENTS

| Number | Country | Date |
|---|---|---|
| 621 | British | 1852 |